United States Patent
Ahn et al.

(10) Patent No.: US 8,441,223 B2
(45) Date of Patent: May 14, 2013

(54) TORQUE CONTROL METHOD FOR HIGH-SPEED SWITCHED RELUCTANCE MOTOR

(75) Inventors: Jin-Woo Ahn, Busan (KR); Dong-Hee Lee, Busan (KR)

(73) Assignee: Kyungsung University Office of Industry-Academy Cooperation, Busan (KR)

(*) Notice: Subject to any disclaimer, the term of this patent is extended or adjusted under 35 U.S.C. 154(b) by 277 days.

(21) Appl. No.: 13/024,127

(22) Filed: Feb. 9, 2011

(65) Prior Publication Data

US 2012/0104986 A1 May 3, 2012

(30) Foreign Application Priority Data

Nov. 3, 2010 (KR) ................ 10-2010-0108733

(51) Int. Cl.
*H02P 1/46* (2006.01)

(52) U.S. Cl.
USPC ... 318/701; 318/254.1; 318/702; 318/400.15; 318/370; 318/696; 310/156.53; 310/106; 310/114; 310/166; 310/181; 363/126; 363/98; 363/40

(58) Field of Classification Search ............... 318/254.1, 318/701, 400.21, 696, 700, 727, 400.04, 318/432, 805, 807, 702, 400.12, 400.15, 318/400.23, 254.2, 370; 310/156.53, 106, 310/114, 166, 216.184, 216.097, 216.112, 310/181, 168; 363/126, 98, 40
See application file for complete search history.

(56) References Cited

U.S. PATENT DOCUMENTS

| | | | | |
|---|---|---|---|---|
| 5,220,259 A | * | 6/1993 | Werner et al. | 318/432 |
| 5,469,215 A | * | 11/1995 | Nashiki | 318/432 |
| 2003/0137262 A1 | * | 7/2003 | Schumacher | 318/432 |

FOREIGN PATENT DOCUMENTS

JP 58054872 A * 3/1983

* cited by examiner

*Primary Examiner* — Walter Benson
*Assistant Examiner* — Jorge L Carrasquillo
(74) *Attorney, Agent, or Firm* — Birch, Stewart, Kolasch & Birch, LLP

(57) ABSTRACT

Disclosed herein is a torque control method for a high-speed Switched Reluctance Motor (SRM), which controls a torque in the high-speed operation of a 2-phase SRM. In the torque control method for a high-speed SRM, a positive torque ($T^*_{mA}$) of an active phase (A phase) of the two phases of the SRM is compensated for based on a negative torque attributable to an inactive phase (B phase) of two phases during a compensation control enable interval ($EN_A$) ranging from a time point at which the active phase (A phase) is turned on to a time point at which tail current of the inactive phase (B phase) remains. Accordingly, the present invention can remarkably reduce a torque ripple occurring in high-speed operation mode in consideration of the influence of a negative torque attributable to tail current.

2 Claims, 7 Drawing Sheets

TORQUE CONTROL METHOD FOR HIGH-SPEED SWITCHED RELUCTANCE MOTOR

BACKGROUND OF THE INVENTION

1. Field of the Invention

The present invention relates, in general, to a torque control method for a high-speed Switched Reluctance Motor (SRM), and, more particularly, to a torque control method for a high-speed SRM, which compensates for the positive torque of an active phase (A phase) of two phases based on a negative torque attributable to an inactive phase (B phase) during a compensation control enable interval ($EN_A$) ranging from a time point at which the active phase (A phase) is turned on to a time point at which the tail current of the inactive phase (B phase) remains, in order to remarkably reduce a high torque ripple that occurs in an overlap area in which the phase switches from an active phase to a subsequent excited phase, in consideration of the non-linear characteristics of a high-speed SRM, and thus to improve drive efficiency.

2. Description of the Related Art

Typically, a Switched Reluctance Motor (SRM) is a kind of reluctance motor which includes principal components such as a poly-phase stator, a rotor, and a position detection unit. The poly-phase stator allows armature coils to be wound therearound and produces a magnetic force. The rotor is rotated by the magnetic force produced by the stator and a magnetic force produced according to the relative position of teeth. The position detection unit is provided with a position detection sensing unit and a sensor plate and is configured to detect the position of the rotor by sensing a position detection pulse with a predetermined angle resolution as the position of the rotor varies. A plurality of teeth are symmetrically formed in the rotor, the armature coils are symmetrically wound around the poly-phase stator, and the position detection sensing unit detects the position of the rotor, and outputs the position detection pulse, so that poly-phase armature coils are sequentially driven in synchronization with the position detection pulse.

Such an SRM controls power that is supplied to the armature coils wound around the poly-phase stator by using switching elements. In this case, as an input pulse signal is applied to the control terminal of the switching elements in synchronization with the position detection pulse output from the position detection unit, an excited state between the rotor and the stator sequentially varies, and thus a forward rotation torque corresponding to the input pulse signal can be generated on the rotor by a magnetic suction force. Further, when a specific excited state does not vary, the rotor can be stopped at a predetermined position. A reverse rotary force (reverse torque) can be produced by controlling the phase of the input pulse signal applied to the switching elements on the basis of the maximum inductance shape. In this way, since various types of drive control for the SRM are possible, such an SRM has been widely and usefully used in a variety of application fields. In particular, an SRM has been frequently applied to and used in high-speed rotary systems such as blowers, compressors, and pumps, thanks to its compact size and excellent system efficiency.

However, the greatest disadvantage of the high-speed SRM is that a torque ripple is greater than that of other motors. In particular, in the SRM, a high torque ripple appears in an overlap area (a current interval) in which a phase switches from an active phase to a subsequent excited phase.

In order to solve this problem, a plurality of conventional technologies related to a torque control method for an SRM have been proposed. One of these technologies is Korean Patent Registration No. 976029. This conventional technology relates to a Direct Instantaneous Torque Control (DITC) system for an SRM using a 4-level converter, and discloses a DITC system for an SRM, which includes a torque estimation unit, a hysteresis control unit, a switching table unit, and a 4-level converter unit. The torque estimation unit estimates torque based on a three-dimensional (3D) Look-up Table (LUT) using detected phase current and the position of a rotor. The hysteresis control unit selects switching rules according to the position of the rotor, and generates the state signals of an input phase and an output phase based on hysteresis control corresponding to a difference between the estimated torque and a reference torque (torque error). The switching table unit converts each state signal into a switching signal composed of four operating modes (mode 1, mode 0, mode −2, and mode 2). The 4-level converter unit controls the operations of the SRM in such a way as to supply a power source voltage to the SRM in mode 1, return the current of coils to a power source in mode 0, supply the power source voltage and a boost capacitor voltage to the SRM in mode 2, and recover the energy stored in the coils to a capacitor in mode −2.

The above conventional technology is advantageous in that relatively smooth torque output can be derived using basic control principles, but has limitations in that complicated switching rules are required to generate a smooth torque in an overlap area, and control performance is determined based on the switching rules determined in this way. Further, there is another problem in that when a DITC technique is used, an additional current controller must be employed.

Another conventional technology, that is, Korean Patent Registration No. 228695 discloses an SRM control method which optimizes the turn-on and turn-off times of the switches of armature coils, thus effectively reducing a torque ripple. This patent is characterized in that an SRM has a turn-on duration corresponding to a predetermined period of time and is operated within the upper limit of delay time on the basis of an LUT which receives a position signal obtained by detecting the position of a rotor and in which speed-based turn-on delay time data preset according to rotation speed is recorded.

However, the conventional technology is still problematic in that a torque ripple in an overlap area is not especially taken into consideration, and thus the influence of the torque ripple that occurs due to tail current in the overlap area cannot be excluded.

Meanwhile, various methods using a torque sharing function have been proposed as a torque control method for an SRM. Graphs of the command torque of a 2-phase SRM using such a torque sharing function, and the command torque and the command current of each phase depending on the mechanical structure of the motor are shown in FIG. 1. An overlap area in which both the 2-phase torques of an active phase and an inactive phase are generated corresponds to an interval in which the rising sections of inductance overlap due to the mechanical shape of the motor. In this interval, the sum of torques of two phases determines the total torque.

The torque ripple appearing in the high-speed operation of the SRM when such an existing torque sharing function is used is shown in FIG. 2. As shown in FIG. 2, current required to generate a command torque in the high-speed operation area starts to be extinguished at a turn-off angle. However, since a torque overlap interval is very short, the current cannot be completely extinguished during the interval, and then tail current is generated. Because this tail current exists in the falling section of inductance, a negative torque is generated, and a high torque ripple occurs for the entire torque due to the negative torque.

That is, the torque control method for the SRM using the existing torque sharing function is simple, but is problematic in that the torque ripple cannot be mitigated at the start and end portions of the overlap area in high-speed operation mode.

PRIOR ART DOCUMENT

Patent Document (patent document 1) Korean Patent Registration No. 976029
(patent document 2) Korean Patent Registration No. 228695

SUMMARY OF THE INVENTION

Accordingly, the present invention has been made keeping in mind the above problems occurring in the prior art, and an object of the present invention is to provide a torque control method for an SRM, which remarkably reduces a high torque ripple that occurs in an overlap area in which a phase switches from an active phase to a subsequent excited phase, in consideration of the non-linear characteristics of an SRM, thus improving drive efficiency even in the high-speed operation interval of the SRM.

In accordance with an aspect of the present invention to accomplish the above object, there is provided a torque control method for a high-speed Switched Reluctance Motor (SRM), the method controlling a torque in high-speed operating mode of a 2-phase SRM, wherein a positive torque ($T^*_{mA}$) of an active phase (A phase) of the two phases of the SRM is compensated for based on a negative torque attributable to an inactive phase (B phase) of two phases during a compensation control enable interval ($EN_A$) ranging from a time point at which the active phase (A phase) is turned on to a time point at which tail current of the inactive phase (B phase) remains.

Preferably, a torque compensation value ($T^*_{cA}$) which is required to compensate for the positive torque ($T^*_{mA}$) of the active phase and based on the negative torque attributable to the tail current of the inactive phase may be a difference between a torque command value ($T^*_{mB}$) for the inactive phase and a torque value ($T_{mb}$) calculated using a Look-up Table (LUT) that is based on actual phase currents of the inactive phase and position angles of a rotor.

Preferably, a torque ($T^*_{mA}+T^*_{cA}$) of the active phase which is compensated for based on the negative torque of the inactive phase may be converted into a current command value determined by an LUT which is based on rotor positions and torques, and the current command value is controlled using a Pulse Width Modulation (PWM) technique.

Preferably, a logical AND operation may be performed on a PWM-controlled current value and an inverted (−) value ($\overline{EN_B}$) of a compensation control enable signal for the inactive phase, and then a resulting value is finally output.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings. Further, in the description of the present invention, if detailed descriptions of related well-known technologies or constructions are determined to make the gist of the present invention unclear, the detailed descriptions will be omitted.

Further, the terms used in the present specification are defined in consideration of the functions in the present invention, and may vary according to the intention or usage of a user or an operator, so that the terms should be defined based on the entire contents of the present specification describing the present invention.

Figure 1:
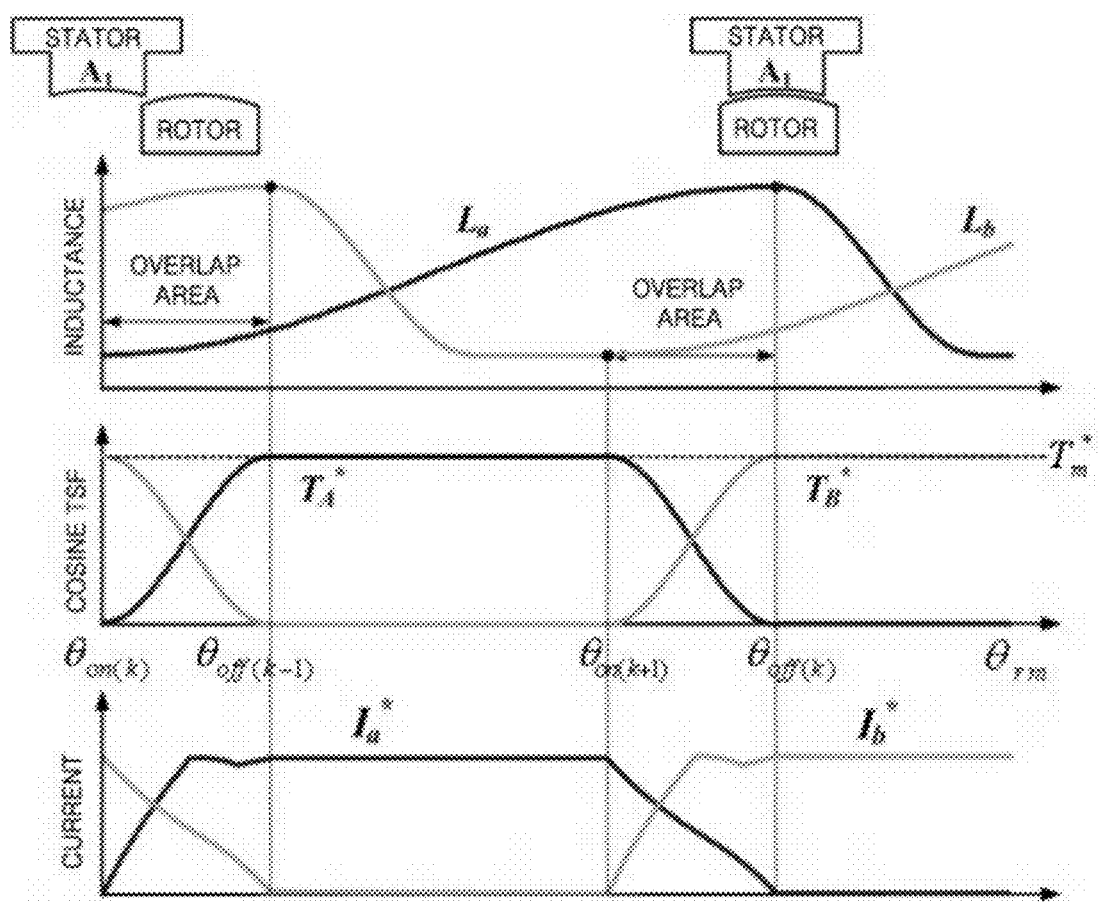
FIG. 1 is a graph showing a conventional torque sharing function and conventional current command.
Figure 2:
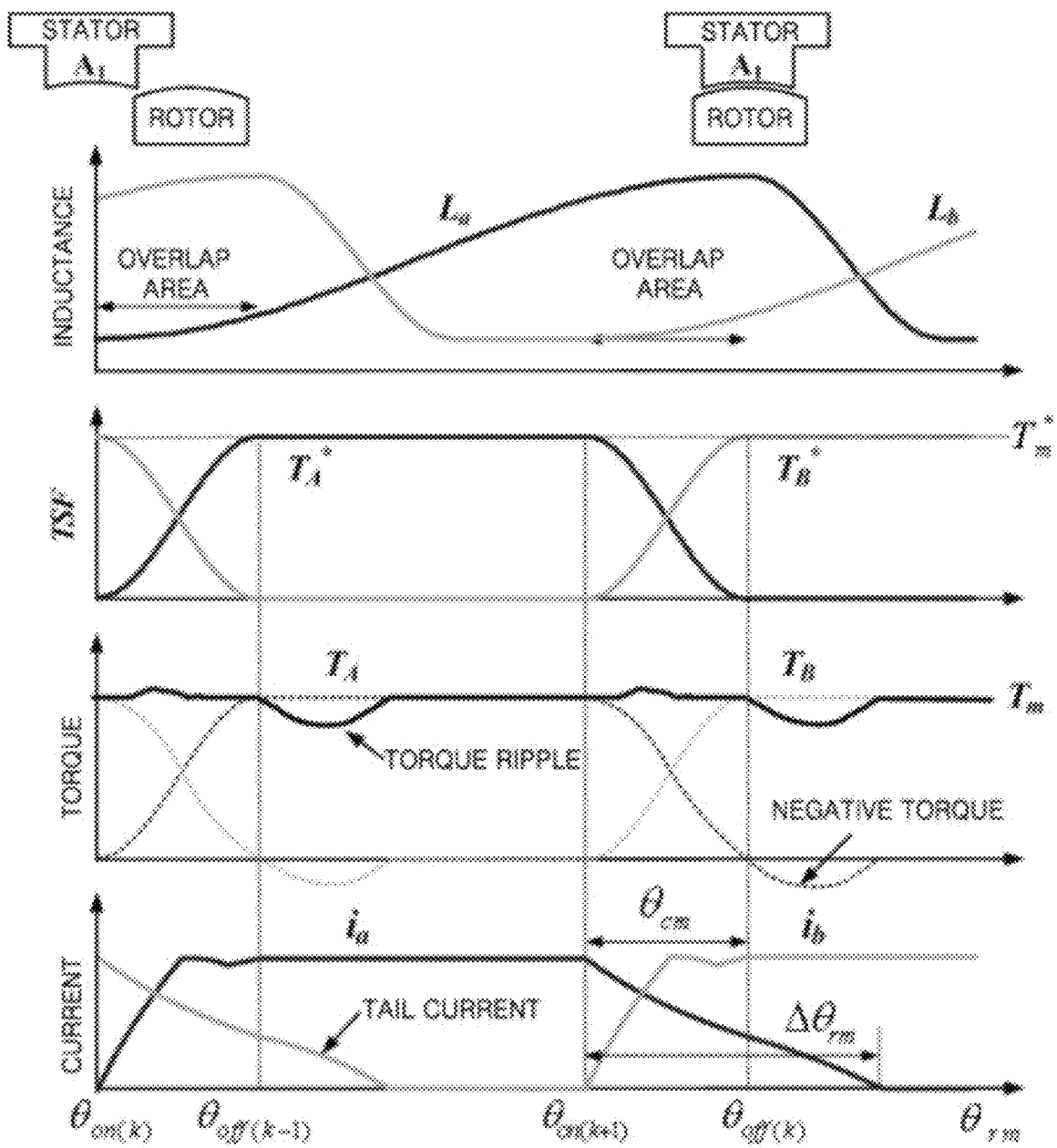
FIG. 2 is a graph showing a conventional torque ripple in the high-speed operation of an SRM.
Figure 3:
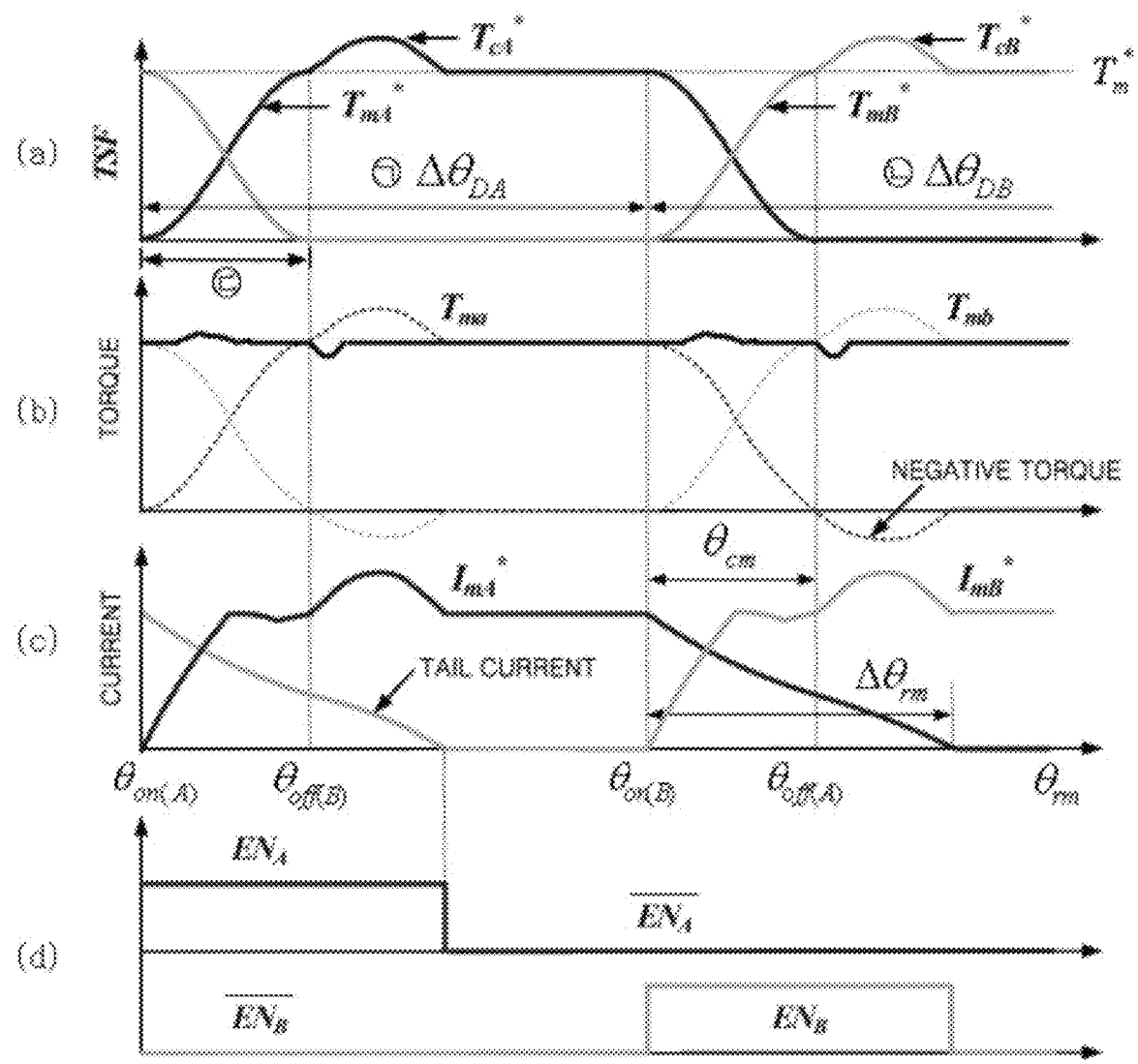
FIGS. 3A to 3D are waveform diagrams showing a torque control method according to an embodiment of the present invention.
Figure 4:
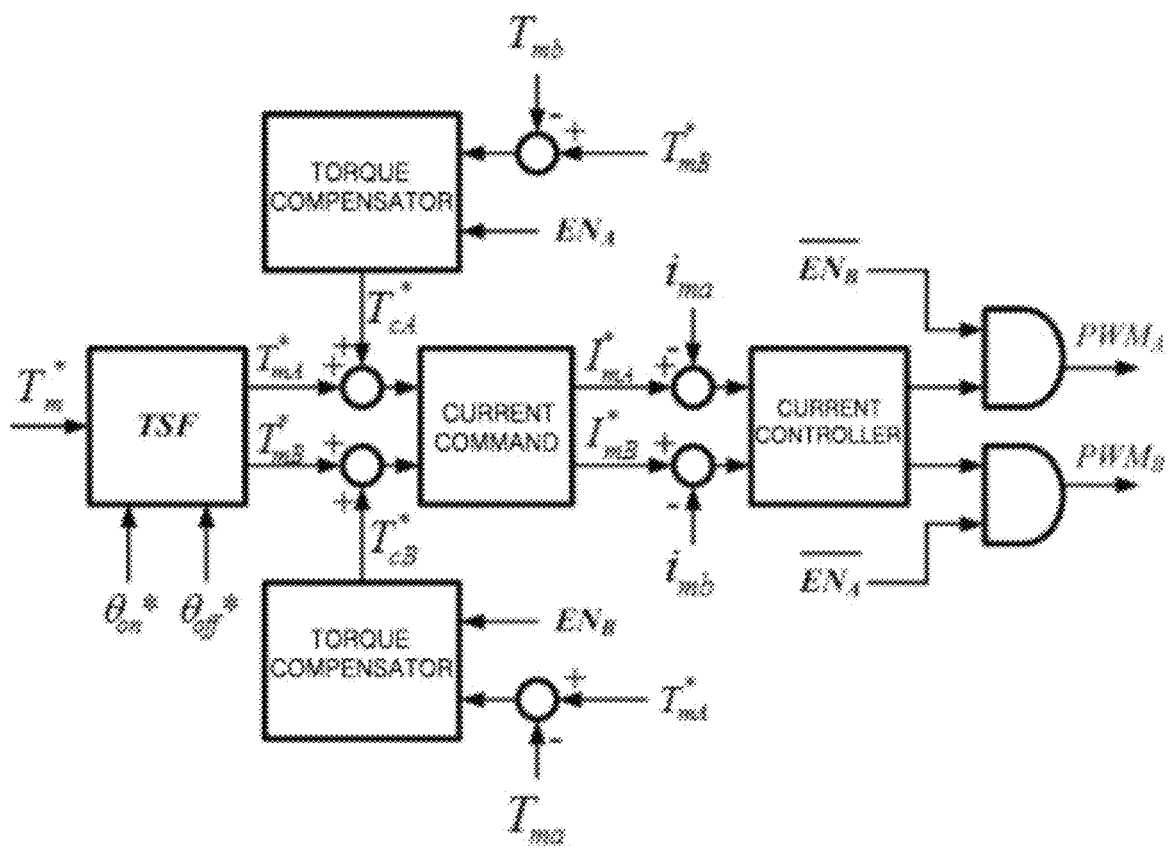
FIG. 4 is a control block diagram showing a torque sharing function required to implement a torque control method according to an embodiment of the present invention.
Figure 5:
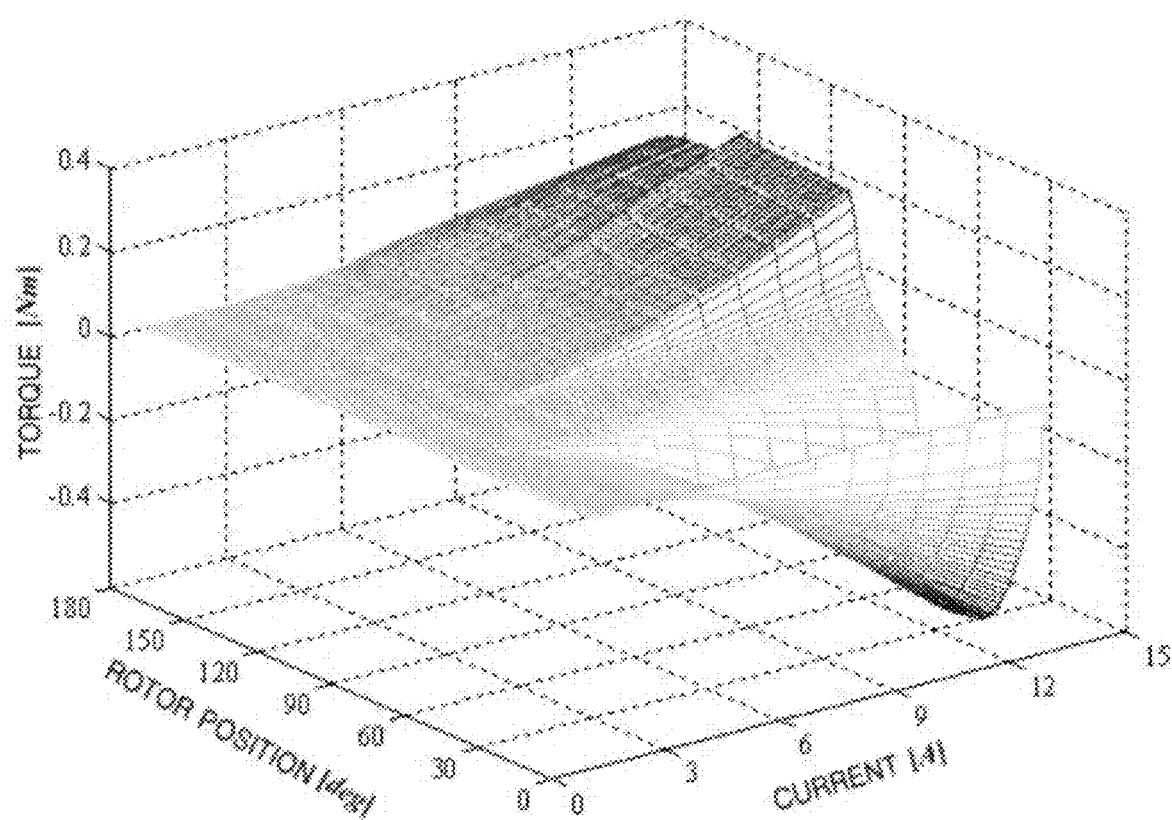
FIG. 5 is a diagram showing an example of an LUT required to compute torques.
Figure 6A:
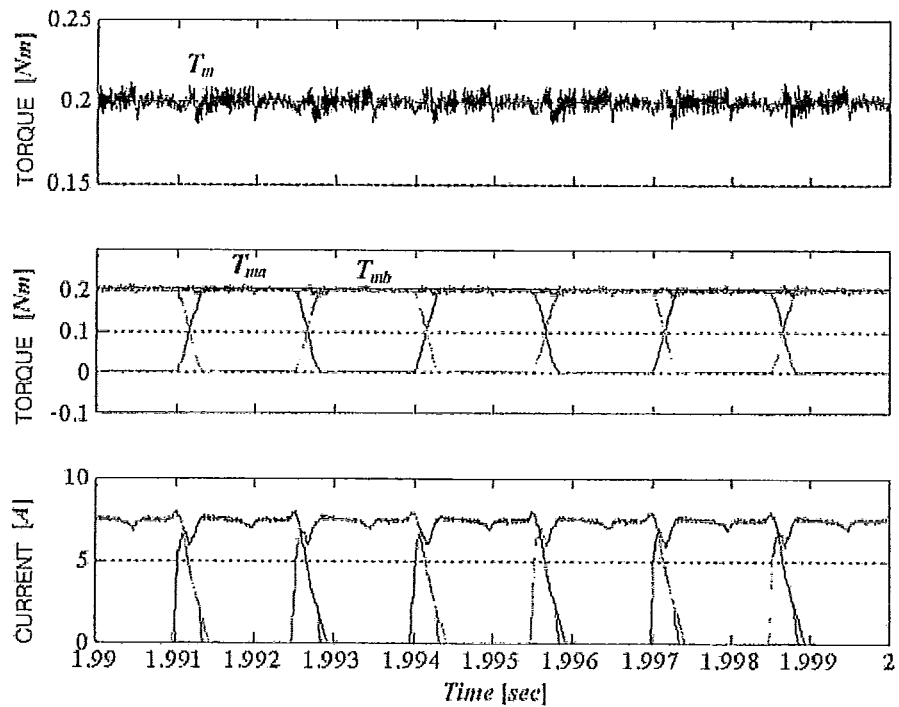
FIGS. 6A and 6B are graphs showing the results of torque analysis using a conventional torque control method.
Figure 6B:
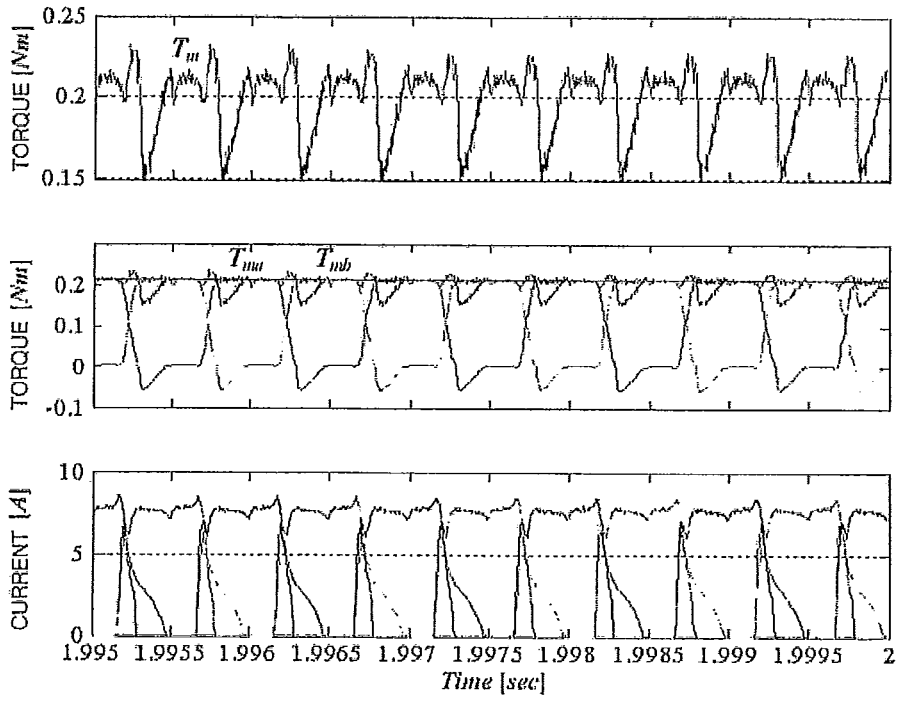
Figure 7A:
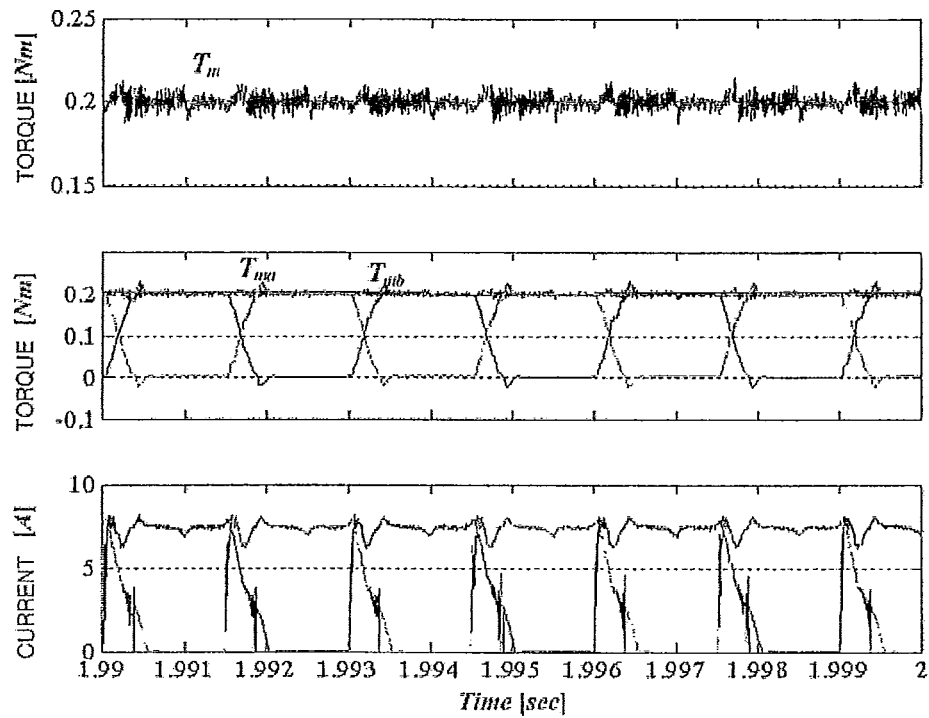
FIGS. 7A and 7B are graphs showing the results of torque analysis using a torque control method according to an embodiment of the present invention.
Figure 7B:
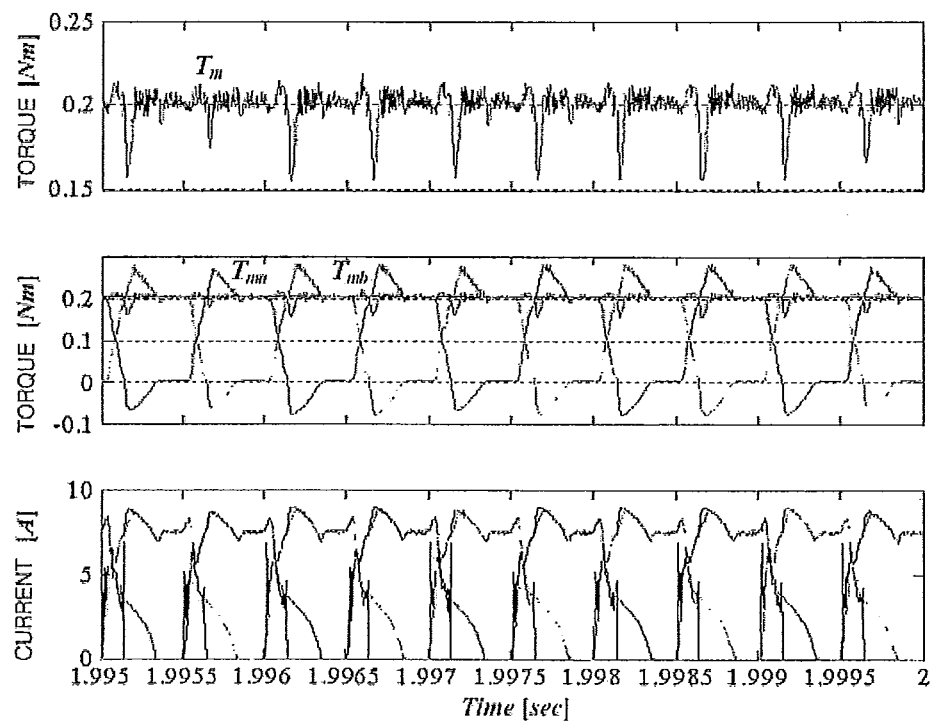

FIGS. 3A to 3D are waveform diagrams showing a torque control method according to an embodiment of the present invention, FIG. 4 is a control block diagram showing a torque sharing function required to implement a torque control method according to an embodiment of the present invention, FIG. 5 is a diagram showing an example of an LUT required to compute torques, FIGS. 6A and 6B are graphs showing the results of torque analysis using a conventional torque control method, and FIGS. 7A and 7B are graphs showing the results of torque analysis using a torque control method according to an embodiment of the present invention.

Prior to describing a torque control method for a high-speed SRM according to an embodiment of the present invention, a voltage equation and a torque equation for a typical SRM are described, which are represented by the following Equations:

$$v = Ri + L(\theta_{rm}, i)\frac{di}{dt} + idL\left(\theta_{rm}, \frac{i}{d\theta}\right)\omega_{rm} \quad (1)$$

$$T_m = \frac{1}{2}i^2 \frac{dL(\theta, i)}{d\theta}\bigg|_{i=\text{constant}} \quad (2)$$

where R: resistance of a phase coil,
$\theta_{rm}$: the position of a rotor,
$\omega_{rm}$: the speed of the rotor, and
$L(\theta_{rm}, i)$: inductance depending on the rotor position at a given current.

The present invention proposes a torque control method based on a new Torque Sharing Function (TSF) for performing compensation based on a negative torque that occurs due to tail current. That is, the present invention relates to a method of setting the active/inactive intervals of each phase of the SRM in advance, and compensating for the current active phase based on a negative torque attributable to an inactive phase, thus suppressing a torque ripple.

Referring to FIGS. 3A to 3D, $\Delta\theta_{DA}$ (interval ⓐ) is the active interval of A phase, $\Delta\theta_{DB}$ (interval ⓑ) is the active interval of B phase, and the current of an inactive phase (B phase with respect to the interval ⓐ) starts to be extinguished at a turn-off angle ($\theta_{off(B)}$). However, as described above, in the case of a high-speed SRM, the time corresponding to a torque overlap interval (interval ⓒ) is very short, so that tail current is generated, as shown in FIG. 3C. The tail current generated in this way is present in the falling section of inductance, thus generating a negative torque, as shown in FIG. 3B.

According to an embodiment of the present invention, during an interval in which the tail current of an inactive phase is generated, the positive torque of the active phase is compensated for based on a negative torque attributable to the inactive phase, thus reducing a torque ripple.

In detail, interval $EN_A$ of FIG. 3D is an interval in which an active phase (in this case, A phase) is compensated for based on the negative torque of an inactive phase (in this case, B phase), and which can be designated as a period ranging from the time point at which the active phase (A phase) is turned on to the time point at which the tail current of the inactive phase (B phase) remains.

Further, interval $EN_B$ of FIG. 3D is an interval in which an active phase (in this case, B phase) is compensated for based on the negative torque of an inactive phase (in this case, A phase) and which can be designated as a period ranging from the time point at which the active phase (B phase) is turned on to the time point at which the tail current of the inactive phase (A phase) remains. Such an interval $EN_A$ or $EN_B$ can be determined by the following Equation (3):

$$\text{if } (\theta_{or(A)} \leq \theta < \theta_{or(B)}) \text{ AND}(\Delta \downarrow > \theta_{cm})) \text{ then } EN_A = 1, \text{ else } EN_A = 0 \quad (3)$$

That is, the torque control method controls the switching of the inactive phase so that when the phase enters a speed area in which a negative torque is generated, the inactive phase that enters a turn-off angle is completely turned off, with the result that tail current can be minimized. Further, compensation based on the negative torque and the torque error generated due to the tail current is performed using the current of a phase present in an active area.

In FIG. 3A, $T^*_{cA}$ is a compensation torque component required to compensate for the active phase (A phase) based on the negative torque and the torque error of the inactive phase (B phase), and $T^*_{cB}$ is the compensation torque component required to compensate for the active phase (B phase) based on the negative torque and the torque error of the inactive phase (A phase). The compensation torque components are respectively calculated by the following Equations (4) and (5):

$$T^*_{cA} = T^*_{mB} - T_{mb} \quad (4)$$

$$T^*_{cB} = R^*_{mA} - T_{ma} \quad (5)$$

where $T^*_{mA}$ and $T^*_{mB}$ denote torque command values of respective phases, $T_{ma}$ and $T_{mb}$ are torque values calculated and predicted by an LUT based on actual phase currents and rotor position angles. FIG. 5 is a diagram illustrating an LUT required to compute $T_{ma}$ and $T_{mb}$. The LUT may be composed of predicted torque data which is stored per 1 [A] and 1 [°] in the range from 0 [A] to 13 [A]. In this case, the LUT has an array of 14 rows and 90 columns.

As described above, when the compensation torque component $T^*_{cA}$ required to compensate for the active phase (for example, the A phase) based on the negative torque and torque error of the inactive phase (for example, the B phase) is determined, the compensation torque component is added to the torque command value $T^*_{mA}$ of the active phase (the A phase), as shown in FIG. 4, and then torque compensation is performed. Thereafter, the added torque value is converted into a current command value $I^*_{mA}$.

Similarly, when the phase B is activated, the same operation as the above operation can also be performed on the phase B. When the compensation torque component $T^*_{cB}$ required to compensate for the active phase (for example, the B phase) based on the negative torque and torque error of the inactive phase (for example, the A phase) is determined, the compensation torque component is added to the torque command value $T^*_{mB}$ of the B phase, and then torque compensation is performed. Thereafter, the added torque value is converted into a current command value $I^*_{mB}$.

In this case, the current command values $I^*_{mA}$ and $I^*_{mB}$ are determined in consideration of the non-linear inductance characteristics of the SRM, and are generally determined using an LUT based on rotor positions and torques. Meanwhile, each current command signal may be designed in the form of an LUT composed of data based on torque command values and rotor positions in the characteristics of a non-uniform gap SRM that is proposed in Korean Patent Appln. No. 2010-0032734 and is filed by the present applicant.

An error between the current command value determined in this way and the actual phase current is controlled by the current controller using a Pulse Width Modulation (PWM) technique. Meanwhile, a logical AND operation is performed on the PWM-controlled output value and an inverted (−) value $\overline{EN_A}$ or $\overline{EN_B}$ of the above-described compensation control enable signal $EN_A$ or $EN_B$, and then the resulting value is finally output.

In summary, when the active phase is the A phase, torque compensation is performed in such a way that the compensation torque component $T^*_{cA}$ required to compensate for the A phase based on the negative torque and torque error of the inactive phase (the B phase) is added to the torque command $T^*_{mA}$ of the A phase. After, the added torque has been converted into the current command value $I^*_{mA}$, PWM control is performed by the current controller. Further, a logical AND operation is performed on the PWM controlled-output value and the inverted (−) value ($\overline{EN_B}$) of the compensation control enable signal of the B phase, and then a resulting signal $PWM_A$ is finally output. Accordingly, when the phase current of the SRM tracks the current command value, the torque of the SRM satisfies the torque command value.

The results of the above-described torque analysis according to the present invention are shown in FIGS. 7A and 7B. FIG. 7A illustrates the results of torque analysis when the rotation speed of the SRM is 10,000 rpm, and FIG. 7B illustrates the results of torque analysis when the rotation speed of the SRM is 30,000 rpm. In comparison with FIGS. 6A and 6B which illustrate the results of torque analysis obtained by the conventional torque control method, it can be seen that in the case of 10,000 rpm at which rotation speed is relatively low and low tail current is generated, the present invention exhibits its torque ripple reduction performance slightly better than that of the conventional method. However, in the case of high speed, that is, 30,000 rpm, it can be seen that the present invention greatly improves torque ripple reduction performance compared to the conventional method.

By the above construction, the torque control method for the SRM according to the present invention can greatly reduce a high torque ripple that occurs in an overlap area in which a phase switches from an active phase to a subsequent excited phase, in consideration of the non-linear characteristics of the SRM, thus improving drive efficiency even in the high-speed operation interval of the SRM.

The embodiment shown to describe the present invention is only a single embodiment in which the present invention is implemented, and it can be seen that, as shown in the drawings, various types of combinations are possible to realize the gist of the present invention.

Therefore, the present invention is not limited to the above embodiment, and those skilled in the art will appreciate that various modifications, additions and substitutions are possible, without departing from the scope and spirit of the invention as disclosed in the accompanying claims.

As described above, a torque control method for a 2-phase high-speed SRM according to the present invention is characterized in that the positive torque $T^*_{mA}$ of an active phase (A phase) is compensated for based on a negative torque attributable to an inactive phase (B phase) of the two phases during a compensation control enable interval $EN_A$ ranging from the time point at which the active phase (A phase) is turned on to the time point at which the tail current of the inactive phase (B phase) remains. Accordingly, the present invention is advantageous in that it can remarkably reduce the torque ripple of the high-speed SRM and can improve drive efficiency in consideration of the influence of the negative torque attributable to tail current present in the overlap area, as well as the non-linear characteristics of the SRM.

What is claimed is:

1. A torque control method for a high-speed Switched Reluctance Motor (SRM), the method controlling a torque in high-speed operating mode of a 2-phase SRM, wherein:

a positive torque ($T^*_{mA}$) of an active phase (A phase) of the two phases of the SRM is compensated for based on a negative torque attributable to an inactive phase (B phase) of two phases during a compensation control enable interval ($EN_A$) ranging from a time point at which the active phase (A phase) is turned on to a time point at which tail current of the inactive phase (B phase) remains;

wherein a torque compensation value ($T^*_{cA}$) which is required to compensate for the positive torque ($T^*_{mA}$) of the active phase and based on the negative torque attributable to the tail current of the inactive phase is a difference between a torque command value ($T^*_{mB}$) for the inactive phase and a torque value ($T_{mB}$) calculated using a Look-up Table (LUT) that is based on actual phase currents of the inactive phase and position angles of a rotor; and wherein a torque ($T^*_{mA}+T^*_{cA}$) of the active phase which is compensated for based on the negative torque of the inactive phase is converted into a current command value determined by an LUT which is based on rotor positions and torques, and the current command value is controlled using a Pulse Width Modulation (PWM) technique.

2. The torque control method according to claim 1, wherein a logical AND operation is performed on a PWM-controlled current value and an inverted (−) value (ENB) of a compensation control enable signal for the inactive phase, and then a resulting value is finally output.

* * * * *